Oct. 15, 1957  S. H. RAYNER  2,809,598
BAKING APPARATUS
Filed Jan. 7, 1955  2 Sheets-Sheet 1

INVENTOR
Stanley H. Rayner
BY Swecker + Mathis
ATTORNEYS

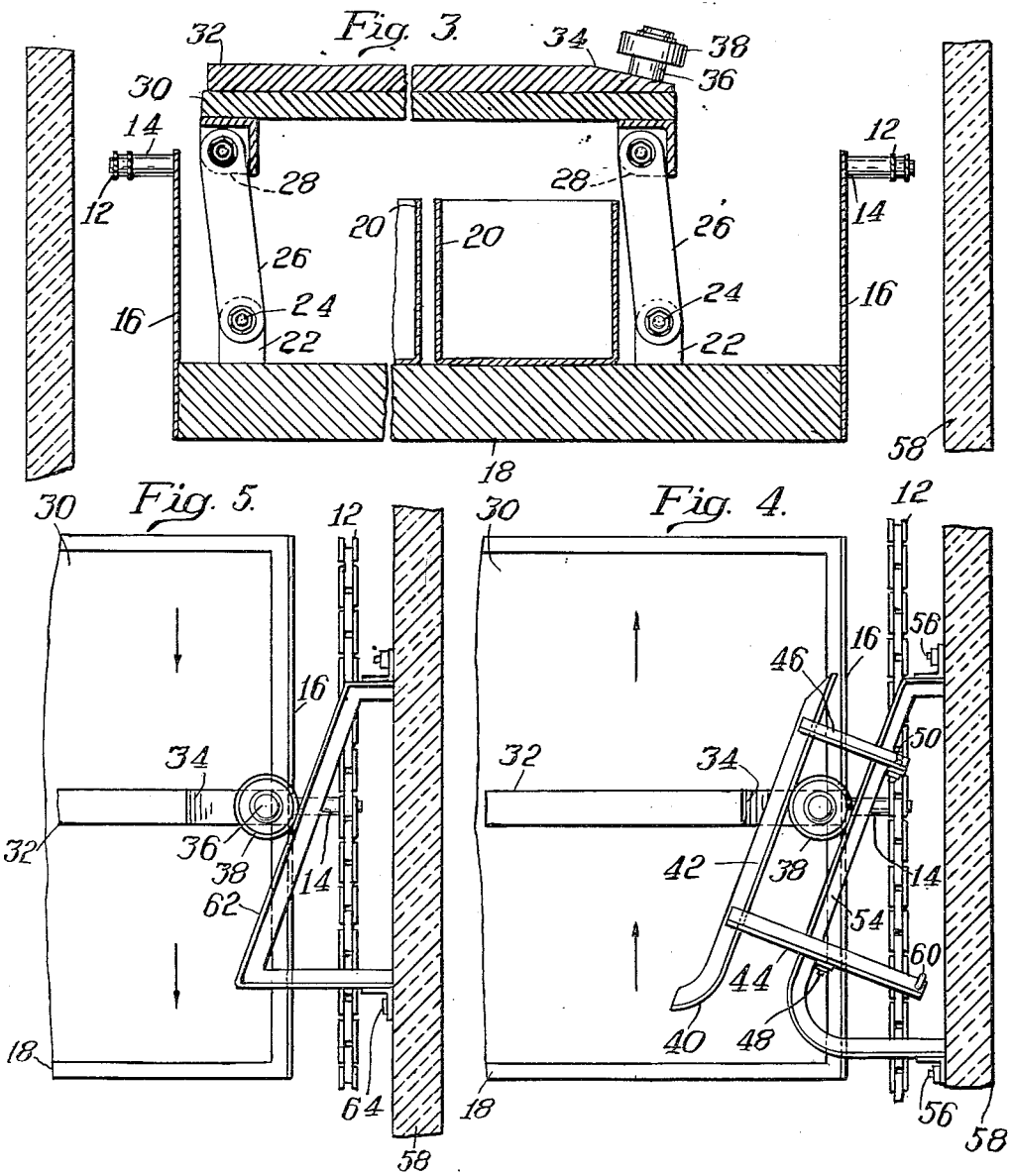

United States Patent Office 2,809,598
Patented Oct. 15, 1957

2,809,598

BAKING APPARATUS

Stanley H. Rayner, Salisbury, Md.

Application January 7, 1955, Serial No. 480,479

10 Claims. (Cl. 107—57)

This invention relates to baking apparatus, and more particularly to ovens of the type used in bakeries for baking products in large quantities.

In the baking of certain products, such as pullman or sandwich loaves of bread, it is desirable to cover the baking pans containing the dough, or other material to be baked, during at least a portion of the baking period. When the baking pans are covered, several advantages are realized. Over-coloring of the first material loaded in the empty oven is eliminated; the crust is more tender and uniform in color than the crusts produced by conventional methods; and the baked product itself has a soft feel.

In spite of the improved results achieved by the use of pan covers, such covers have not been used in commercial baking as extensively as would seem to be indicated. This fact is, no doublt, the result of the increased difficulty and expense which has accompanied the use of pan covers.

The system in use prior to the present invention required the oven attendant to place pan covers on each strap of baking pans prior to the insertion of the pans into the oven, and to remove the covers from the pans as they were removed from the oven so that the bread or other baked product might be dumped from the pans. These cover handling operations consumed substantial amounts of time, with a corresponding reduction in the potential capacity of the oven. Furthermore, the handling of the hot pan covers posed a significant safety problem.

Aside from the difficulties involved in handling the pan covers of the prior art, the system proved to be an expensive one from the standpoint of equipment maintenance. The pan covers had to be replaced at frequent intervals due to the bending and abuse thereof, which occurred during the application and removal of the covers from the baking pans.

This invention overcomes the difficulties associated with the prior art system of baking in covered pans by permanently attaching pan covers to the conveyer means of the oven in such a way that the pan covers may be raised and lowered in respect to the conveyer means. As the conveyer means approaches the pan loading station, the pan cover is caused to assume its elevated position so that the baking pans may be positioned upon the conveyer means below the pan covers. Then, as the conveyer means moves on, past the loading station, the cover is lowered so as to rest upon the top edges of the baking pans.

The pan cover of this invention is substantially flat. With a cover of this configuration, the sides of the baking pans remain exposed to the hot atmosphere of the oven so that proper heating for uniform baking is assured.

Although the pan covers of this invention may be applied to any of the commercial ovens now in use, their use is particularly advantageous in ovens of the tray type. In this type of oven, a plurality of trays are suspended from an endless conveyer, and a number of baking pans are supported upon each of the trays. As the conveyer moves, the trays are carried through the baking zone of the oven. After the baking has been completed, the pans containing the baked product are removed from the trays, and other pans are loaded onto the trays. One of the pan covers of the present invention is movably mounted upon each of the trays so that it may assume a covering relationship with respect to the pans carried by the tray, without regard to the path of travel of the tray. The significance of this feature will be apparent when one considers the devious courses followed by the trays in some commercial ovens.

Each of the pan covers is attached to its tray by parallel links so that the lower surface of the pan cover will always remain parallel with the upper surface of the tray. This permits the handling of pans of different heights in the equipment, the only requirement being that all of the pans on a given tray be of the same height.

The raising and lowering of the pan covers is brought about by stationary cams fixed to the walls of the ovens. These cams are so located as to control cam followers carried by the pan covers as the conveyer moves along through the oven. There may be as many of these cams as necessary, and the cams may be located at such positions in the oven as to satisfy the varying requirements of the production or the demands of the baker. Also, the cam for lowering the pan covers may be mounted so that it may be moved to an inoperative position from the outside of the oven, when desired. Thus, it is possible to carry out the entire baking operation with the pans in the uncovered condition.

A better understanding of this invention and its many features and advantages will be gained from a consideration of the following detailed description of an embodiment thereof, illustrated in the accompanying drawings in which:

Fig. 3 is an enlarged vertical cross-sectional view, along the line 3—3 in Fig. 1;

Fig. 4 is a detail view approximately along the line 4—4 in Fig. 1, showing the pan cover lowering cam;

Fig. 5 is a detail view approximately along the line 5—5 in Fig. 1, showing the pan cover raising cam.

Figure 1:
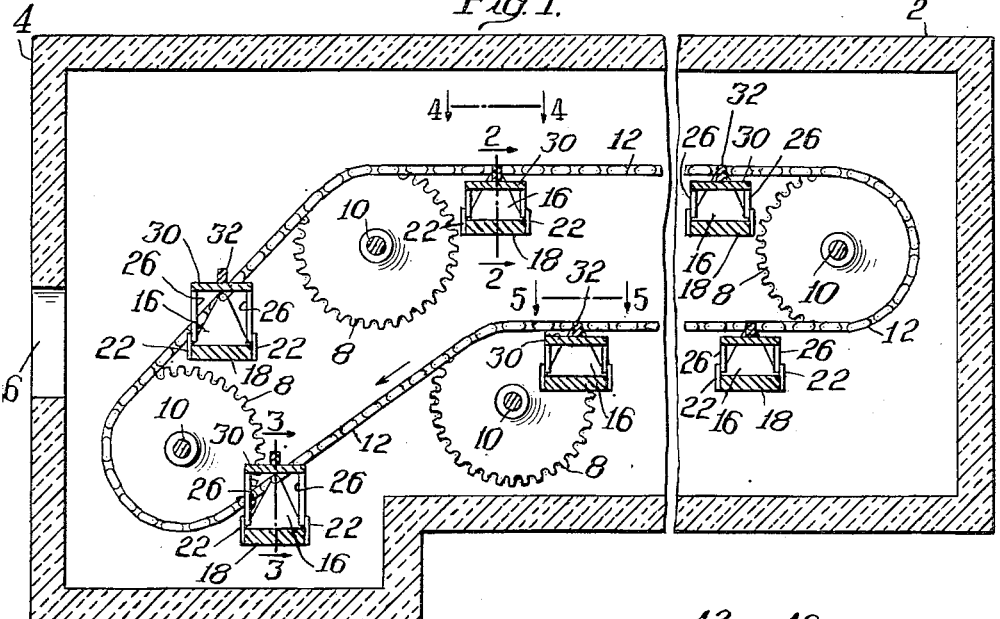
Fig. 1 is a somewhat diagrammatic longitudinal cross-sectional view of a single-lap, tray type oven.

It will be evident to persons skilled in the art that the illustration of a particular type of oven in Fig. 1 of the drawings is by way of example only. The principle of this invention may be applied to tunnel ovens, reel ovens, double-lap ovens, etc., as well as to the single-lap oven illustrated in Fig. 1. Additionally, it is pointed out that the showing of Fig. 1 is largely schematic. Many of the structural features of the oven have been omitted from the illustration in the interest of clarity. These features have no direct bearing upon the present invention and they are well known in the art.

The oven walls are indicated generally by the numeral 2. These walls are of insulating material, as is conventional in the art. The front wall 4 of the oven is interrupted by an opening 6 through which the oven may be loaded and unloaded. In many ovens, sliding doors are provided for closing the opening 6 when desired. Also, in many ovens, a separate discharge opening is provided in one of the side walls. Since the present invention is not dependent in any way upon these features, they have been omitted from Fig. 1.

Disposed within the oven are a plurality of sprocket wheels 8, rotatably mounted upon shafts 10. A set of four of the sprocket wheels 8 is located close to each of the side walls of the oven, with the sprocket wheels 8 of each set being arranged in the pattern illustrated in Fig. 1. Carried by the sprocket wheels 8 of each set, is an endless conveyer chain 12. One of the shafts 10 is driven by suitable power means to cause the chains 12 to move in the paths defined by the sets of sprocket wheels and in the direction indicated by the arrow in Fig. 1.

Pivotally suspended between the chains 12 by means of sub shafts 14 and tray hangers 16 are a number of trays 18. The trays 18 are relatively heavy so that their upper surfaces will remain in a horizontal position throughout their paths of travel on the chains 12. In the drawings, the upper surfaces of the trays 18 are flat. However, as is well understood in this art, the surfaces may be ribbed somewhat to space the bottoms of the baking pans 20 slightly above portions of the upper surfaces of the trays to facilitate heat transfer.

The baking pans 20 have been omitted from Fig. 1, because of the small scale of this view. The relationship of the pans 20 with respect to the other elements will be clear from a consideration of Figs. 2 and 3.

Mounted upon the front and back surfaces of each of the trays 18 are upstanding bracket members 22. These brackets carry pivots 24 at their upper ends, and parallel links 26 are attached to the pivots. The upper ends of the parallel links 26 are pivotally connected to depending bracket members 28, carried by a pan cover 30. The cover 30 may be formed, if desired, of 22 gauge sheet metal with round 3/16 inch perforations on 1/4 inch centers.

Figure 2:
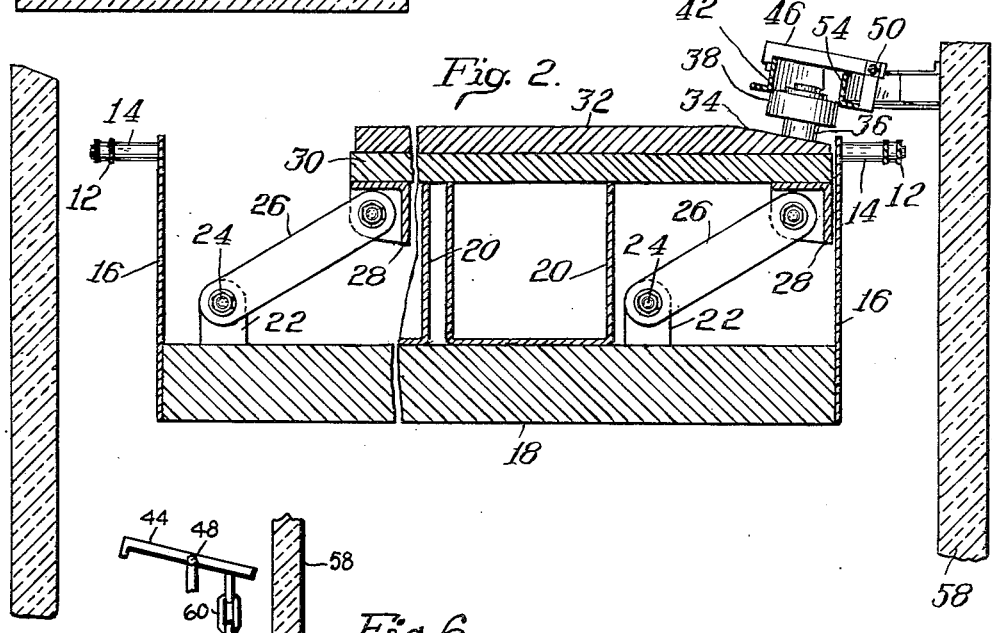
Fig. 2 is an enlarged vertical cross-sectional view, along the line 2—2 in Fig. 1.

In the position illustrated in Fig. 2, the pan cover 30 has just been lowered so that its lower face is in contacting relationship with respect to the upper edges of the baking pans 20 located on the tray 18. This position is assumed at some point in the path of travel of the tray 18 beyond the zone in which the pans 20 are loaded onto it, as will be evident from Fig. 1. The particular position in which the lowering of the cover is brought about can be determined to suit the particular requirements of the baking operation being carried out. As will be described hereinafter, the means for lowering the pan covers operates automatically so that it may be inaccessible to the oven attendant without in any way interfering with its operation.

In Fig. 3, the cover 30 is shown in its raised position with respect to the baking pans 20. In this position, the links 26 bear against the lower edges of the brackets 28 to prevent the cover from swinging too far to the left, as viewed in Fig. 3. The position illustrated is a stable one so that no special means need be provided for holding the cover in this position.

As in the case of the lowering of the pan cover 30 into the position shown in Fig. 2, the raising of the pan cover into the position shown in Fig. 3 may take place at any desired point in the path of travel of the trays 18 through the oven. Again, the operating means is entirely automatic so that it may be located in positions which are not accessible to the attendant.

The upper surface of the pan cover 30 carries a bracing rib 32 along its longitudinal center portion. The upper surface of the rib 32 is horizontal for most of its extent, but is cut away at a slight angle near one of its ends to provide an inclined surface 34. Extending from the inclined surface 34 is a spindle 36 upon which is rotatably mounted a cam follower or control bearing 38.

The cam means for raising the pan cover 30 is best illustrated in Fig. 4 of the drawings. The tray 18 in Fig. 4 moves in the direction indicated by the arrows applied to it. As the cam follower 38, in the raised position of Fig. 3, moves along in the direction of the arrow, it contacts the flared entrance end 40 of a cover lowering cam track 42. The cam track 42 is inclined with respect to the direction of travel of the tray 18, and as the cam follower 38 moves along the inside surface of the cam track 42, it is shifted laterally with respect to the tray 18. This lateral movement of the cam follower 38 and the cover 30 to which it is attached is accompanied by a lowering of the cover 30 into the position shown in Fig. 2.

The cam track 42 is fixed to links 44 and 46, pivotally connected at 48 and 50 to upstanding brackets attached to a guide track 54. The guide track 54 is attached by means of bolts 56 or other suitable means to a side wall 58 of the oven.

Figure 6:
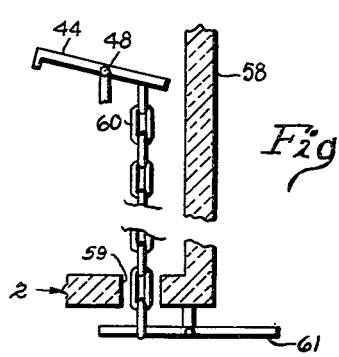
Fig. 6 is a detail vertical cross sectional view showing the mechanism for rendering the pan cover lowering cam of Fig. 4 inoperative when desired.

The links 44 and 46 normally rest upon the upper edge of the guide track 54 to maintain the cam lowering track 42 in its operative position. However, these links may swing about the pivots 48 and 50 so as to lift the cam track 42 out of the path of the cam follower 38. In some circumstances it may be desired to lift the cam track out of its operative position so that the baking may proceed with the pan covers in the raised position. This may be accomplished by depressing the outer end of one of the links 44 by pulling on a chain or other connecting member 60, attached to the link and extending downwardly through a hole 59 in the bottom of the oven 2. As shown in Fig. 6, the lower end of the chain 60 may be connected to an actuating lever 61 pivotally mounted on the exterior of the oven 2.

Additionally, the raising of the cam track 42 may take place automatically. Normally, the cam follower 38 will remain in engagement with the inner surface of the cam track 42 until it drops below the lower edge of such surface. The parts are dimensioned so that the cam follower 38 moves out of engagement with the surface of the cam track 42 just as the lower surface of the pan cover 30 comes into covering relationship with respect to baking pans of minimum height. When taller pans are employed, the cam follower 38 will still be in engagement with the cam track 42 when the cover 30 contacts the upper edges of the pans 20. In this situation, further lateral movement of the cam follower 38 will not take place. Instead, the cam track 42 will be raised, swinging about the axis of the pivots 48 and 50. This feature of the invention permits the handling of pans of different heights without making alterations or adjustments of the equipment.

The guide 54 prevents the cam follower 38 from swinging uncontrolledly to the right, as viewed in Fig. 3. Unless this track were present, the upper edges of the pans 20 and the lower surface of the cover 30 might be damaged by the impacts which would occur from time to time.

The cam means for raising the pan covers of this invention is best illustrated in Fig. 5 of the drawings. In this view, the tray 18 is moving in the direction of the arrows applied thereto.

The cover raising cam is a simple cam track 62, disposed at an angle with respect to the direction of travel of the pan 18. It is held in fixed relationship with respect to the side wall 58 of the oven by means of bolts 64 or other suitable fastenings. As the cam follower 38 moves along in the direction of travel of the tray 18, it will contact the surface of the cam track 62 and be moved laterally to the left from the positions shown in Figs. 2 and 5. This lateral movement is accompanied by a raising of the cover 30 as the parallel links 26 swing about the piovts 24.

It should be noted that Figs. 4 and 5 are taken on planes parallel to the inclined surface 34 of the cover bracing rib 32 rather than on absolutely horizontal planes. The inclination of the surface 34 is such as to dispose the axis of the cam follower 38 at a small inclination with respect to the vertical. In this position, the inclination of the surface of the cam follower 38 is maintained more nearly constant during the shifting movement of the cover 30, and more perfect cooperation between the cam follower and the cam tracks is achieved.

The operation of the apparatus of this invention will now be summarized.

When the conveyer chains 12 are set in motion by the application of power to one of the sprocket wheels 8, the trays 18 travel along through the oven. As a tray passes the opening 6 in the front wall of the oven, it is loaded with bread pans 20. At this time, the cover 30 is in the raised position shown in Fig. 3.

As this tray moves on into the oven, the cam follower 38 attached to its pan cover 30 comes into contact with the cover lowering cam track 42, Fig. 4, and the cover is shifted downwardly and to the right. This brings the lower face of the cover into contact relationship with the upper edges of the baking pans 20, as illustrated in Fig. 2.

At the end of the baking cycle, or at some time prior to the end of the cycle, the cam follower 38 comes into contact with the cover raising cam track 62 illustrated in Fig. 5. This cam track causes the follower 38 and the attached pan cover 30 to be shifted upwardly and to the left from the position illustrated in Fig. 2 to the position illustrated in Fig. 3. The parts remain in these relative positions until the tray 18 again moves to that portion of the conveyer path adjacent the opening 6. Then the pans 20 containing the already baked products are removed from the tray 18, and new pans containing unbaked material are inserted.

While a single embodiment of this invention has been described in considerable detail, various modifications will be apparent to persons skilled in the art. It is intended, therefore, that the foregoing description should be considered as exemplary only, and that the scope of the invention should be determined from the following claims.

I claim:

1. In a bakery oven having a baking zone, means for heating said zone, and power driven conveyer means for conveying pans of material to be baked through said zone, the improvement which comprises a pan cover having a substantially flat lower surface adapted to rest upon the top edge of a pan of material to be baked while leaving the side walls of the pan substantially exposed to the heat of said baking zone, means for mounting said pan cover on said conveyer means for movement relative thereto in a direction having a vertical component, and stationary cam means adjacent the path of said conveyer means for lowering and raising said pan cover into and out of covering relationship with respect to a pan of material carried by said conveyer means as said conveyer means moves relative to said cam means.

2. A bakery oven tray having an upper surface for supporting a baking pan containing material to be baked, a pan cover having a substantially flat lower surface for resting upon the upper edge of the baking pan, and a plurality of parallel links pivotally connected near their lower ends to said tray and pivotally connected near their upper ends to said pan cover so as to permit raising and lowering of said cover relative to said tray while maintaining the lower surface of said pan cover substantially parallel to the upper surface of said tray, whereby baking pans of different heights may be accommodated.

3. In a bakery oven having a heated baking zone and conveyer means for conveying baking pans containing material to be baked through said zone, the improvement which comprises a pan cover adapted to rest upon the top edges of a plurality of baking pans carried by said conveyer means, a set of parallel links each of which is pivotally connected to said conveyer means and pivotally connected to said pan cover, and means for automatically swinging said pan cover on said parallel links into and out of covering relationship with respect to said baking pans.

4. In a bakery oven having a heated baking zone and conveyer means for conveying baking pans containing material to be baked through said zone, the improvement which comprises a pan cover adapted to rest upon the top edges of a plurality of baking pans carried by said conveyer means, a set of parallel links each of which is pivotally connected to said conveyer means and pivotally connected to said pan cover, a cam follower attached to and extending upwardly from said pan cover, a stationary cam track in the path of movement of said cam follower for swinging said cover on said parallel links to raise it from covering relationship with respect to said baking pans.

5. In a bakery oven having a heated baking zone and conveyer means for conveying baking pans containing material to be baked through said zone, the improvement which comprises a pan cover adapted to rest upon the top edges of a plurality of baking pans carried by said conveyer means, a set of parallel links each of which is pivotally connected to said conveyer means and pivotally connected to said pan cover, a cam follower attached to and extending upwardly from said pan cover, a stationary cam track in the path of movement of said cam follower for swinging said cover on said parallel links to lower it into covering relationship with respect to said baking pans.

6. In a bakery oven having a heated baking zone and conveyer means including a generally horizontal portion for conveying baking pans containing material to be baked through said zone, the improvement which comprises a pan cover having a generally horizontal lower face adapted to rest upon the top edges of a plurality of baking pans carried by said horizontal portion of said conveyer means, a set of parallel links each of which is pivotally connected to said conveyer means and pivotally connected to said pan cover, a cam follower attached to the top of said pan cover and extending upwardly and outwardly from a side portion thereof at an angle to the vertical, a cam track having a cam face inclined at about the same angle as said cam follower, and means for mounting said cam track on said oven, said cam face being located in the path of movement of said cam follower and extending laterally at an angle with respect to such path so as to swing said cover on said parallel links as said cover moves past said cam track.

7. In a bakery oven having a heated baking zone and conveyer means for conveying baking pans containing material to be baked through said zone, the improvement which comprises a pan cover adapted to rest upon the top edges of a plurality of baking pans carried by said conveyer means, a set of parallel links each of which is pivotally connected to said conveyer means and pivotally connected to said pan cover, a cam follower attached to and extending upwardly from said pan cover, a cam track, and means for mounting said cam track in said oven so that it will normally assume a position in the path of movement of said cam follower for swinging said pan cover on said parallel links but permitting it to move out of said path under the influence of said cam follower when said cover has reached the limit of its swinging movement.

8. In a bakery oven having a heated baking zone and conveyer means for conveying baking pans containing material to be baked through said zone, the improvement which comprises a pan cover adapted to rest upon the top edges of a plurality of baking pans carried by said conveyer means, a set of parallel links each of which is pivotally connected to said conveyer means and pivotally connected to said pan cover, a cam follower attached to and extending upwardly from said pan cover, a cover-lowering cam track, means for mounting said cam track in said oven so that it will normally assume a position in the path of movement of said cam follower for swinging said pan cover on said parallel links but permitting it to be moved out of said path, and means operable from the exterior of said oven for moving said cam track out of said path so that said cover will not be lowered onto the baking pans.

9. In a bakery oven having a baking zone adapted to be heated, an endless conveyer extending into said zone, and a plurality of trays suspended from said conveyer for carrying a plurality of baking pans containing material to be baked through said baking zone, the improvement which comprises a plurality of pan covers each of which is adapted to rest upon the top edges of the baking pans carried by one of said trays while leaving the side walls of said pans substantially exposed to the heat of said zone, a set of parallel links movably mounting each of said pan covers on one of said trays, the links of each of said sets being pivotally connected to the tray and pivotally connected to the pan cover associated therewith, first means adjacent a first portion of the path of said conveyer operating as each of said trays moves over said first portion of the path of the conveyer to move the pan cover mounted thereon into covering relationship with respect to the pans carried thereby, and second means adjacent a second portion of the path of said conveyer operating as each of said trays moves over said second portion of the path of the conveyer to move the pan cover mounted thereon away from its pan covering position.

10. In a bakery oven having a heated baking zone and conveyer means for conveying baking pans containing material to be baked through said zone, the improvement which comprises a pan cover adapted to rest upon the top edges of a plurality of baking pans carried by said conveyer means, means for mounting said pan cover for movement into and out of covering relationship with respect to said pans, a cam follower attached to said pan cover, a cover-lowering cam track, means for mounting said track in said oven so that it will normally assume a position in the path of movement of said cam follower but permitting it to be moved out of said path, and means operable to move said cam track out of said path so that said cover will not be lowered onto the baking pans.

References Cited in the file of this patent

UNITED STATES PATENTS

| | | |
|---|---|---|
| 775,913 | Dietz | Nov. 29, 1904 |
| 1,491,689 | Gantvoort | Apr. 22, 1924 |
| 1,672,954 | Pointon | June 12, 1928 |
| 2,539,423 | Howard | Jan. 30, 1951 |
| 2,648,298 | Holbeck | Aug. 11, 1953 |

FOREIGN PATENTS

| | | |
|---|---|---|
| 7,173 | Great Britain | Nov. 12, 1915 |